United States Patent Office 3,102,296
Patented Sept. 3, 1963

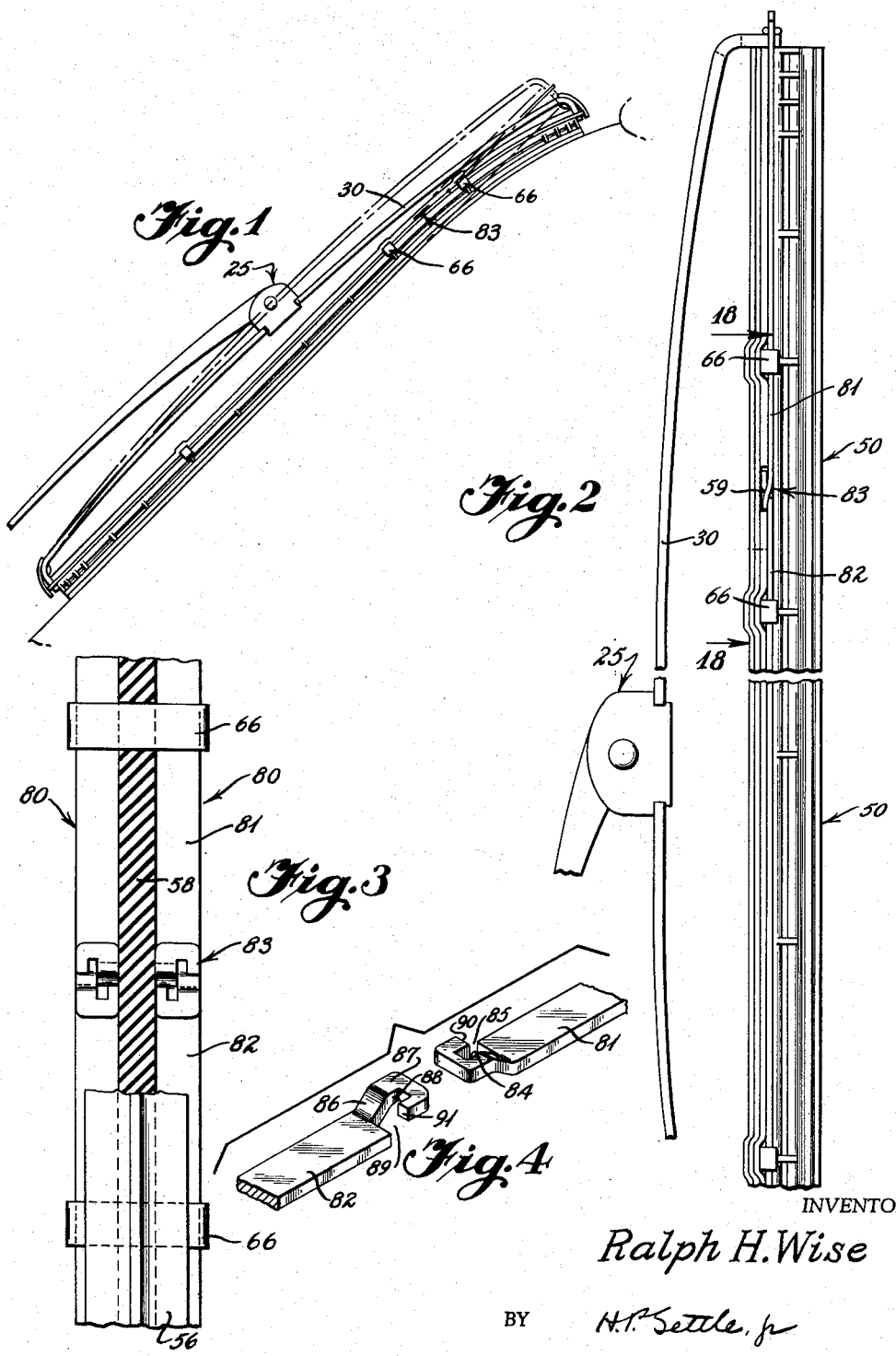

3,102,296
WIPER BLADE
Ralph H. Wise, 211 N. Church Ave., Dyersburg, Tenn.
Filed Aug. 19, 1959, Ser. No. 834,741
8 Claims. (Cl. 15—250.42)

The present invention relates to a windshield wiper blade and more particularly to a blade for wiping a windshield of radically curved contour.

Present automotive windshields are substantially curved, both transversely and vertically, to present a convex exterior surface which can only be wiped by a resilient rubber wiping edge.

The prior art devices attempt to force the wiping edge against the windshield surface by compression loads imposed on spaced vertical portions of the wiping blade element by various forms of whiffletrees, linkages, springs, or the like.

These various compression loading structures are inherently incapable of applying to the wiping element a uniformly distributed load and further involve complicated structures including several moving parts constantly exposed to the weather. Additionally, these cumbersome loading structures are so heavy, bulky and expensive as to render impossible the adequate wiping of all of the surface area of today's large automobile windshields. Consequently, large portions thereof, particularly at the upper or header molding portions are not traversed by the present blades, thus largely nullifying the additional visibility supposedly provided by the increased glass area.

In my earlier filed application 808,668 filed April 24, 1959, I have proposed a new approach to the problem of efficiently wiping windshield surfaces of compound curvature area.

In the blade structure proposed in my earlier application, a torsion-resistant spring steel carrier, deflectable from a planar configuration in a direction normal to the windshield surface, carries an inherently resilient wiping element and is supported at its ends only, completely independently of the wiping element. The carrier is subjected to a predetermined tensile load imposed thereon by a bow forming the primary structural element of the blade, the tensile loading normally maintaining the carrier in a single plane. The bow is stressed during assembly from a relaxed or stressed-free condition, so as to subject the carrier to a constantly applied tensile stress, the magnitude of which varies in direct proportion to the degree of deflection of the carrier from its normal planar configuration. The earlier invention thus proposes a torsion-resistant spring steel carrier which is uniformly deflectable throughout its length.

I have now found that to adapt the blade to a windshield of radially variant contour, such as the contour of the "corners" of a sharply swept-back or "wrap-around" windshield, an articulated carrier is preferable. In such an articulated carrier, the articulated portions thereof are urged into substantial uniplanar relation or longitudinal alignment by the tensile loads imposed on the carrier by the bow. However, the articulated carrier portions are misalignable despite the tensile loads imposed thereon by the bow upon resilient deflection of the wiping element. Thus, the use of an articulated carrier accommodates unequal longitudinal deflection thereof, even though the carrier is uniformly tensioned longitudinally.

In effect, the use of an articulated carrier removes the resistance of the readily deflectable carrier to sharp deflection about an arcuate windshield portion of quite small radius of curvature. At the same time, the tensile loading of the carrier constantly urges the articulated carrier portions into alignment and insures instant and accurate confirmation of the carrier and the wiping element edge to less sharply arcuate or even planar portions of the windshield.

It is, therefore, an important object of this invention to provide an improved windshield wiper blade having a wiping edge capable of instant and accurate confirmation to a radically curved windshield.

Another object of this invention is a provision of a wiper blade for a sharply arcuate windshield, the blade utilizing an articulated wiping element carrier having separate interconnected portions tensionally stressed toward planar alignment and relatively pivotally movable from such alignment to accommodate wiping element confirmation to a windshield surface independently of the flexural capabilities of the carrier.

It is a further object of this invention to provide an articulated area for a rubber windshield wiping element, the carrier having an hinge incorporated therein intermediate to the length of the wiping element to provide a support element which is both resiliently and pivotably distortable during traverse of a windshield to insure torsion-resistance support for the windshield element as the element resiliently conforms to the windshield contour.

Still another important object of this invention is the provision of a windshield wiper blade in which a resiliently deflectable wiping element is supported against torsional deformation by a tensioned carrier, the carrier being subdivided into separate hingedly connected portions normally urged into planar alignment by the carrier tension, but hingedly movable relative to one another to accommodate deformation of the inherently resilient wiping element to a windshield of sharply curved configuration.

Other objects and advantages of the invention will appear from the following detailed description taken in conjunction with the annexed drawings in which:

On the drawings:

FIGURE 1 is a side elevational view of the windshield wiper blade of the present invention applied to a windshield of sharply variant curvature;

FIGURE 2 is an enlarged elevational view similar to FIGURE 1 illustrating the blade in a normal or relaxed condition;

FIGURE 3 is an enlarged fragmentary elevational view of the blade, with parts broken away in sections; and FIGURE 4 is an enlarged, fragmentary, exploded perspective view illustrating the articulated carrier structure of the present invention.

As shown on the drawings, in FIGURE 1, reference numeral 30 refers generally to a bow or main structural element of the wiper blade of the present invention. The bow 30 has attached to a medial portion thereof a connector 25 for securing the complete blade to an oscillatable actuating arm.

The bow 30 is substantially the same as that illustrated in my earlier filed application, Serial No. 808,668 and the remote ends of the bow are secured to spaced carrier strips 81 joined one another at their ends and tensioned by the bow. Each of the strips 80 is subdivided into two strip portions 81 and 82 interconnected by an hinge construction indicated generally at 83 and illustrated in detail in FIGURE 4. Each such strip portion is provided with a re-entrant aperture 84, 88, having a restricted opening 85, 89 opening laterally in opposite directions. Each aperture strip portion 81, 82 is provided with an inclined portion 86 so that the ends of the slots 84, 88 are elevated above the plane of the remainder of the strip portions 81, 82. The elevated or upper terminal planar portions 87 of the strips 81, 82 lie parallel to the planes of the major strip portions.

Assembly of the strip portions 81 and 82 to form the completed strip is effected simply by transversely aligning the slots 85, 89, thus overlapping the terminal portions thereof provided with the re-entrance slots or openings 84, 88, and then moving the strips relatively transversely into a longitudinal alignment. Upon such movement the upper portion 87 of the strip portion 82 overlies the adjacent portion of the strip 81 and the corresponding portion of the strip portion 81 overlies the strip 82. The inclined portion 86 of the upwardly set portion of the one strip 82 is abutted by the terminal end 90 of the strip 81 adjacent the opening of the end 85 and similar abutment occurs between the end 91 and inclined portion 86 of the strip portion 82. Consequently, the strips are locked together against longitudinal separation when subjected to the tensile load imposed thereon by the bow 30, but relative vertical pivotal movement therebetween is accommodated. Such longitudinal tension is applied by the bow 30 inasmuch as the inturned ends of the bow are deformed from their normal, relaxed, or non-tensioned position during assembly. Consequently, the strip portions 81 and 82 are maintained under tension and in firmly locked engagement with one another.

As best illustrated in FIGURE 2, a portion 59 of the uppermost rubber body portion 56 is preferably removed in the immediate vicinity of the hinge 83, so as to accommodate the vertical displacement of the two strip portions upon relative movement. In effect, the slots 55 have merely been opened laterally by the removal of the rubber portions 59.

Thus, the aligned strip portions 81 and 82 of each of the two carrier strips 80 are readily insertable into the recesses provided therefor in the rubber wiping element, all as described in my above identified earlier application. In order to prevent relative displacement of the strips 80 and the wiping element 50, additional securing clips 66 are provided to either side of the hinge 83, such clips being underturned at their extreme edges and overlying the strips 80, respectively, to join the strips and wiping element 50 in firm assembly.

In operation, the strips 80 are not laterally deflectable, but are deflectable readily in a plane normal to the surface of a windshield being wiped by the wiping element 50 carried thereby.

In addition to the resilient deflection of the strips, the strip portions 81, 82 are hingedly movable relatively to one another because of the presence of the hinge 83. Preferably the hinge is located so as to coincide substantially with the point of transition of the windshield from a relatively planar portion to a more sharply arcuate portion so that the terminal end of the wiping element can sharply deflect. Such sharp deflection of the wiping element is accommodated by coincident and coextensive deflection of the hinged carrier portions 81 and 82 relative to one another. In other words, the hinge accommodates the sharp deflection of the carrier portions relative to one another, and thereby accommodates similar deflection of the wiping edge.

The location of the hinge 83 longitudinally of the blade and the relative length of the carrier portions 81 and 82 are variable in accordance with the contour of the windshield to be wiped. In this manner, it is possible to "tailor-make" a carrier to a specific windshield contour and the improved wiping resulting therefrom will be readily appreciated. Additionally, if necessary, more than one such hinge 83 can be provided throughout the length of each carrier strip 80, so that various intricate surfaces of compound curvature can be readily and accurately wiped.

While preferred embodiments have been described above in detail, it will be understood that numerous modifications might be resorted to without departing from the scope of the invention as defined in the following claims.

What is claimed is:

1. A windshield wiper blade having a resiliently deformable elongated wiping element, a carrier coextensive with said element and projecting therebeyond, said carrier supporting said element against torsional deflection along the length thereof, and a main structural element secured to those portions of said carrier projecting beyond said element and effective to subject said carrier to a substantial, constantly applied tensile force of fluctuating magnitude, said carrier being subdivided longitudinally into independently pivotally movable portions, said element being supported by said carrier for resilient deformation to a concave configuration upon contact with a convex surface and said carrier portions each being resiliently flexible and relatively pivotally movable relative to one another to accommodate such deformation of said element and to assume a substantially equivalent concave configuration, the main structural element subjecting said carrier to an increased tensile force during such deformation to resist both resilient flexing and relative pivoting of said carrier portions.

2. A windshield wiper comprising a resiliently deformable wiping element having an edge adapted for contact with a windshield, a carrier inherently flexible in a plane normal to the windshield but rigid in planes parallel to the windshield supporting said element against torsional deflection and comprising a pair of pivotally interconnected longitudinally aligned portions, and a supporting superstructure engaging said carrier at the remote ends thereof and maintaining said carrier under tension at all times to normally maintain said carrier portions in alignment while accommodating relative pivotal movement therebetween.

3. A windshield wiper comprising a primary support having remote terminal portions joined by a medial longitudinal portion, a carrier having pivotally interconnected portions each of which is secured to one of the terminal portions of said support and tensioned therebetween to resist relative pivotal movement of the portions and an inherently resilient, stress-free wiping element supported by said carrier against torsional deflection.

4. A windshield wiper blade having a resiliently deformable elongated wiping element for contacting a windshield, a carrier strip of greater width than thickness and frictionally engaging said element along the length thereof, said strip being resiliently flexible only in the plane of its thickness, and a main structural means engaging the carrier, the improvement of subdividing the carrier strip into longitudinally aligned portions, and means pivotally interconnecting the carrier strip portions, said last-named means accommodating conformation of the carrier to the windshield surface by relative pivotal movement of the carrier strip portion, as well as by resilient flexing of the strip, whereby each of said carrier strip portions is both resiliently flexible and pivotally movable to accommodate deformation of said element to a curved windshield surface.

5. A windshield wiper comprising a resiliently deformable wiping element having an edge adapted for contact with a windshield and longitudinal recesses spaced from said edge, resilient carried strips seated in said element recesses and projecting beyond the longitudinal confines of said element to define a carrier supporting said element against torsional deflection, said strips each comprising separate normally longitudinally aligned portions, means pivotally interconnecting the portions of each strip for relative movement about pivot axes aligned transversely of the element edge, and an arched supporting bow having its end portions secured to said carrier at the longitudinally remote ends thereof and subjecting said carrier only to a constantly applied tensile stress to normally maintain said strip portions aligned while said wiping element is free of tensile stress.

6. A windshield wiper comprising a primary support having remote terminal portions joined by a medial longitudinal portion, a non-extensible carrier comprising an elongated strip of greater width than thickness and having interconnected longitudinally subdivided portions secured, respectively, to the terminal portions of said support and suspended under tension therebetween, an inherently resilient, substantially stress-free wiping element supported by said carrier against torsional deflection while being free for edge conformity to a convex windshield surface, and means accommodating relative pivotal movement of said carrier portions as well as resilient deformation thereof.

7. A windshield wiper blade having a resiliently deformable elongated wiping element for contact with a windshield, an articulated carrier resiliently flexible in a plane normal to the windshield but rigid in planes parallel to the windshield comprising two sections hingedly interconnected and cooperatively frictionally engaging said element along the length thereof, and a main structural member secured to the ends only of said carrier and effective to subject said articulated carrier to a substantial constantly applied tensile force of fluctuating magnitude to urge said interconnected sections into longitudinal alignment, said element being unsupported other than by said carrier for deformation to a concave configuration upon contact with a convex surface and said carrier sections being both resiliently flexible and relatively pivotally movable to accommodate such deformation of said element and to assume a substantially equivalent concave configuration, the wiping element being free of any tensile stresses of a magnitude exceeding the magnitude of the carrier-element frictional force.

8. In a windshield wiper, a wiping element having a reduced wiping edge contactible with a curve windshield surface and supported against torsional deflection and for curved conformation to said curved surface by a pair of spaced carrier strips flexible in a plane normal to the surface and rigid in planes parallel to the surface, each of said strips consisting of at least two hingedly connected sections, a main structural element having end portions directed toward the windshield surface joined by an arcuate medial portion, and securing means interconnecting the end portions of said carrier strips only, the main structural element end portions abutting the securing means, said wiping element being stress-free and said carrier strip sections being tensionally stressed into alignment by said main structural element confined against said securing means.

References Cited in the file of this patent
UNITED STATES PATENTS

| | | |
|---|---|---|
| 2,596,063 | Anderson | May 6, 1952 |
| 2,601,664 | Nesson | July 4, 1952 |
| 2,659,097 | Morton | Nov. 17, 1953 |

FOREIGN PATENTS

| | | |
|---|---|---|
| 1,045,263 | Germany | Nov. 27, 1958 |